United States Patent [19]

Hecking

[11] Patent Number: 5,176,440
[45] Date of Patent: Jan. 5, 1993

[54] POLE ASSEMBLY AND METHODS THEREOF

[76] Inventor: Dirck J. Hecking, 5167 Tilly Mill Rd., Dunwoody, Ga. 30338

[21] Appl. No.: 834,482

[22] Filed: Feb. 12, 1992

[51] Int. Cl.⁵ .............................. F21S 1/02
[52] U.S. Cl. .................... 362/152; 362/249; 362/431; 239/289; 239/279
[58] Field of Search .......... 362/1, 145, 249, 431, 362/253, 152; 239/289, 280, 279; 273/29 R

[56] References Cited

U.S. PATENT DOCUMENTS

| | | | |
|---|---|---|---|
| 1,794,467 | 3/1931 | Lucas | 362/431 |
| 3,222,509 | 12/1965 | Thedford | 362/431 |
| 3,865,309 | 2/1975 | Greenhalgh | 239/289 |
| 4,141,056 | 2/1979 | Neely | 362/431 |
| 5,007,587 | 4/1991 | Daroca | 239/289 |

FOREIGN PATENT DOCUMENTS 1532095   5/1968   France ............... 362/431
10699   of 1899   United Kingdom ....... 362/431

Primary Examiner—James C. Yeung
Attorney, Agent, or Firm—Hopkins & Thomas

[57] ABSTRACT

A pole assembly is configured to be placed in line with a fence. The pole assembly has a sleeve(s) transversely situated therethrough. The sleeve serves as a pass-through for a horizontal rail of the fence. The pole assembly comprises an electrical channel for supplying power to a light fixture or some other device disposed at the upper end of the pole assembly. Moreover, the pole assembly can have a water path for providing water to a sprinkler to be affixed to the pole assembly at an elevated location.

20 Claims, 4 Drawing Sheets

POLE ASSEMBLY AND METHODS THEREOF

FIELD OF THE INVENTION

The present invention generally relates to support and maintenance systems for fenced areas, and more particularly, to lighting and sprinkler systems for tennis courts and other fenced areas.

BACKGROUND OF THE INVENTION

In the conventional art, lighting systems for tennis courts are generally implemented by positioning light poles having light fixtures around the perimeter of a link chain fence surrounding one or more tennis courts. Typically, the light poles are thirty feet high or greater. Moreover, attempts are made to adjust the light beam from one or more light fixtures to a particular location on each tennis court so that the entire area of each court is illuminated.

The lighting fixtures on each pole usually require approximately 1000 watts of power from a 110 volt to 440 volt power source. Such a high power consumption is necessary to generate and project sufficient light onto the tennis courts.

These tall light poles are usually constructed from various pieces which can easily be stored and shipped. A major reason for designing the conventional light poles for easy storage and transportation is that electricians who install the light poles do not have heavy lift equipment for manipulating large, heavy, light poles.

Another aspect in regard to tennis court support and maintenance involves sprinkler systems. Sprinkler systems are necessary for frequently dampening clay and crushed stone style tennis courts. These types of tennis courts must be watered down over four times a day. Traditionally, tennis courts have been dampened by using numerous sprinklers which are situated on the ground. Because of the surrounding fence, sprinklers are generally placed within the fenced area so as not to be blocked by the fabric of the link chain fence. Moreover, the sprinklers are slightly spaced from the fence around the inner perimeter so that the sprinklers can rotate around in angular motion without interference from the fence.

The sprinklers usually comprise a spraying apparatus which is fixed into a water outlet in the ground. The water outlet often is merely a pipe nipple rising out of the ground from a water pipe network connected remotely to a water source.

Although the lighting and sprinkler support systems for tennis courts have thus far been adequate, they are problematic, burdensome, unsightly, and makeshift. The lighting systems do not optimally light the tennis courts during the night. Dark areas undesirably reside on the courts between the lighted areas illuminated by the light poles. Moreover, much of the light projected from the light poles onto the tennis courts is wasted because of the huge distance from the light fixtures to the tennis courts.

Other problems with the lighting systems are associated with the placement and construction of the light poles. The light poles must be placed even further away from a fenced area if a sidewalk abuts the fence. Because of the piece-wise construction of the light poles, the light poles are not aesthetically appealing. Furthermore, winds can induce twisting moment on the light poles, thereby causing destruction of the light poles and potential property damage and/or injury to life.

Existing sprinkler systems for fenced-in tennis courts also need improvement. When clay or crushed stone tennis courts are "dragged," or groomed by a tractor or some other similar means, the sprinklers and/or the water outlet itself is frequently damaged, destroyed, or clogged by debris.

A need exists in the art for better support and maintenance systems, particularly lighting and sprinkler systems, for tennis courts and other fenced areas.

SUMMARY OF THE INVENTION

The present invention is a system for providing light and/or water within an area surrounded by a fence. For instance, an area containing one or more tennis courts. The fence has a horizontal fence rail. In accordance with the present invention, a novel light pole assembly is adapted to be positioned in line with the fence in order to provide light and/or water within the fenced area, as hereafter described.

The light pole assembly has a cylindrical pipe with a base end and a light fixture end. The base end is mounted in the ground. The light fixture end has at least one gradual L-shaped bend leading to a flange where a light fixture may be mounted. The cylindrical pipe has an internal sleeve transversely situated therethrough. The horizontal fence rail is inserted through the internal sleeve so that the light pole assembly becomes part of the fence. Furthermore, an electrical path means is disposed in the light pole assembly to provide electrical power to the light fixture(s). The electrical path means has an electrical supply inlet situated at the base end of the cylindrical pipe. An electrical channel through the length of the pipe provides a throughway for electrical wires. Finally, an electrical outlet is provided at each flange to permit connection of the electrical wires with light fixtures.

The light pole assembly in accordance with the present invention may further include a sprinkler path means. The sprinkler path means has a sprinkler supply inlet situated at the base end of the cylindrical pipe. A sprinkler channel is disposed through the cylindrical pipe. Moreover, a sprinkler outlet is situated along the cylindrical pipe somewhere above the ground. The sprinkler outlet is adapted to accept connection of a water sprinkler.

The present invention overcomes the deficiencies of the prior art, as described above, and further provides for the following additional advantages.

The present invention provides for optimal lighting within a fenced area. Because of better lighting efficiency, light bulbs with lesser power demands may be utilized to accomplish optimal lighting.

In accordance with the present invention, the light pole assembly becomes an integral part of the fence. As a result, the light pole assembly and the fence promote the stability of each other. The combination of the light pole assembly and fence inhibits the twisting moment of any winds.

Because of the sleeve which is affixed transversely through the cylindrical pipe of the light pole assembly, the light pole assembly is substantially strengthened. Instead of a soft point in the light pole assembly, the passthrough becomes a hard (support) point.

The single-piece construction of the light pole assembly in accordance with the present invention adds substantial stability to the light pole assembly in the presence of high winds.

In accordance with the present invention, any commercially available light fixture may be connected to the flange(s) provided at the elevated end of each light pole assembly. It is further envisioned that video cameras, surveillance apparatus, or other equipment may be mounted to the flange. Flange adaptors increase the utility by enabling any manufacturer's equipment to be used.

The light post assemblies in accordance with the present invention are aesthetically pleasing in that they become an integral part of the fence and eliminate obstacles to onlookers situated at the outer periphery of the fence.

The light pole assembly in accordance with the present invention is configured so that it can easily be handled by two men. Moreover, erection can take less than ten minutes.

As a further advantage of the present invention, a fence contractor can install the light pole assembly using ordinary fence equipment. Moreover, fence contractors are much cheaper than electrical contractors. Hence, the cost of installing the light post assemblies in accordance with the present invention is substantially less than installing light towers around the outer periphery of the fence.

Because of the design of the present invention, the light pole assembly can be implemented before a fence is installed, during the installation of the fence, or after a fence has been installed by retrofitting the light pole assembly into the existing fence.

The present invention further provides for implementing a sprinkler system for providing water to the fenced area. This concept has particular application to clay and crushed stone tennis courts, which must be watered down many times a day. In addition, because sprinklers can be positioned far above ground, the sprinklers can cover more territory and are not damaged by tractors which groom the tennis courts.

Further features and advantages of the present invention will become apparent to one of skill in the art upon examination of the following drawings and text. It is intended that any additional features and advantages be incorporated herein.

BRIEF DESCRIPTION OF THE DRAWINGS

The present invention, as defined in the claims, can be better understood with reference to the following drawings. The drawings are not necessarily to scale, emphasis instead being placed upon clearly illustrating principles of the present invention.

DETAILED DESCRIPTION OF THE PREFERRED EMBODIMENT

Figure 1:
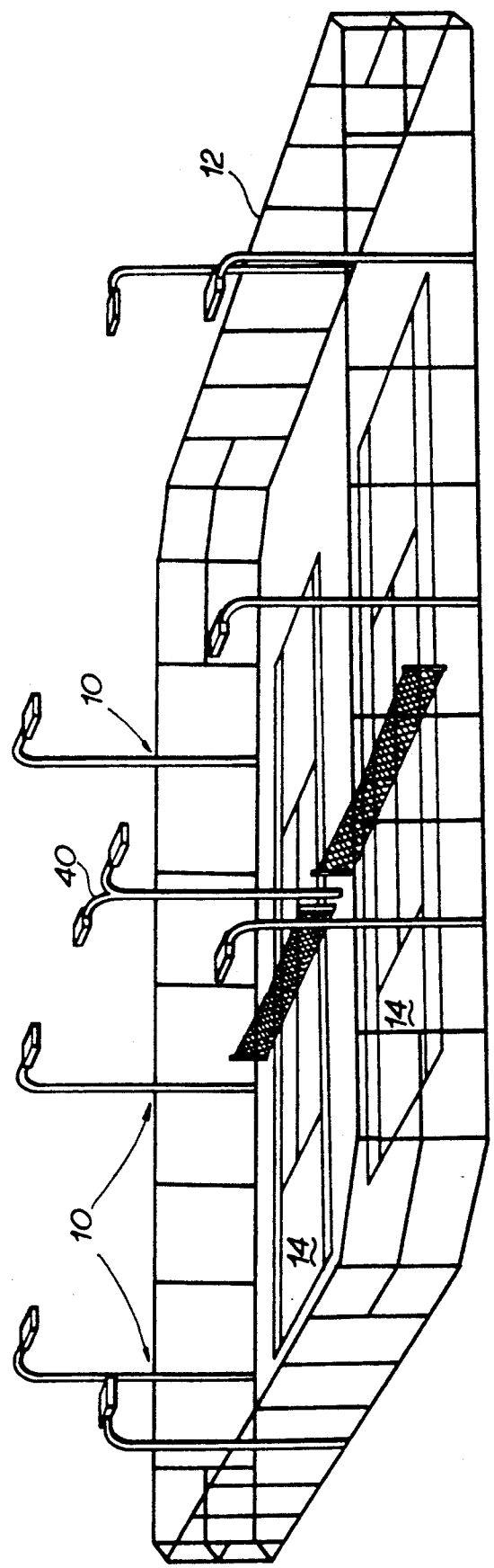
FIG. 1 shows a perspective view of a fenced area having light post assemblies integrated into the fence in accordance with the present invention.

As shown in FIG. 1 by way of example, light post assemblies 10 are situated in line with a fence 12 so as to provide efficient and optimal lighting and/or water to a fenced area 14, having one or more tennis courts. Because of the close proximity of the lights to the tennis courts, no dark patches exist on the courts, and the courts can be lighted adequately with less power consumption.

Moreover, because the light post assemblies 10 are integrated into the fence 12, a unitary strong combination results. Consequently, the light pole assemblies 10 and the fence 12 promote the stability of each other, and the combination inhibits the twisting moment of any winds.

Figure 2:
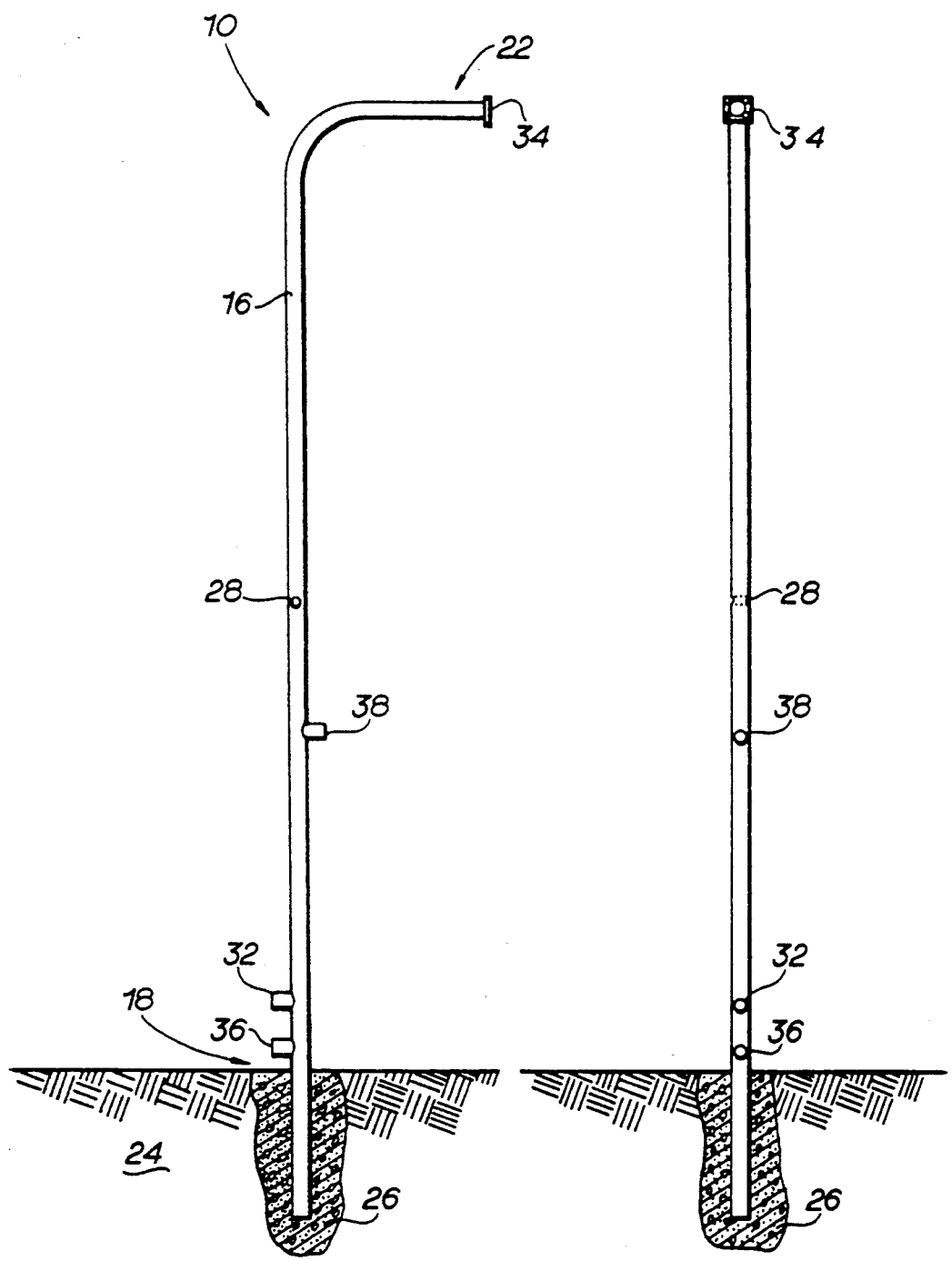
FIG. 2 shows a basic light pole assembly in accordance with the present invention.

FIG. 2 shows a light pole assembly 10 in accordance with the present invention for supporting a single light fixture. The light pole assembly 10 has a cylindrical pipe 16 with a base end 18 and a light fixture end 22. In the preferred embodiment, the cylindrical pipe 16 is made of steel or some other strong material which is about 1/16 to ⅛ of an inch in thickness. Further, the pipe 16 is approximately 4 inches in outside diameter (OD). Preferably, the steel is not galvanized so that it can be painted.

The base end 18 of the cylindrical pipe 16 is mounted in the ground 24 via cement 26 or some other similar bonding material. In the preferred embodiment, the base end 18 of the light pole assembly 10 extends into the ground three feet. The light pole assembly 10 linearly rises eighteen feet from the ground to a point where it gradually bends in an L-shaped pattern. The rise of the bend is two feet and the extension of the bend into the fenced area is three feet. It is preferable to have either a 80° or 90° bend.

As further illustrated in FIG. 2, an internal sleeve 28 is welded into the center of the cylindrical pipe 16 so as to provide a "passthrough" for a horizontal rail, such as a top rail, midrail, or both, of the fence 12. In the preferred embodiment, the horizontal rail is the top rail 12 of the fence. The internal sleeve 28 provides a point of support for the light pole assembly 10. Furthermore, the internal sleeve 28 enables the light pole assembly 10 to be placed in line with the fence 12.

In the preferred embodiment, the internal sleeve 28 is made from 12 gauge steel (about 1/16 inch) and has an inside diameter (ID) of 1¾ to 2 inches. Typically, the horizontal fence rail is approximately 1⅝ inches OD. Hence, the horizontal fence rail will easily slide through the internal sleeve 28 during installation of the light pole assembly 10. It is preferable to have a snug fit between the internal sleeve 28 and the horizontal fence rail so as to decrease relative movement and wear.

The light pole assembly 10 has an electrical path for providing electrical power to the flange 22, where a light fixture is to be disposed. An electrical supply inlet 32 is provided to permit entry of electrical wires. The inlet 32 can be merely a hole or a commercially available pipe nipple of any appropriate size. An electrical junction box may be placed around the nipple 32. Moreover, the cylindrical pipe 16 is hollow to permit the electrical wires to transgress to an electrical outlet 34, which is surrounded by the flange 22. The electrical wires passing through the cylindrical pipe 16 may be enclosed in conduit. Further, the outlet 34 can be a hole or a pipe nipple allowing passage of the electrical wires to an external light fixture.

The light pole assembly 10 can also be equipped with a sprinkler path for providing water to the fenced area 14. A sprinkler supply inlet 36 is disposed at the base end 18 of the light pole assembly 10. The inlet 36 is a pipe nipple or similar water interfacing device in the preferred embodiment. A pipe or hose situated internally to the cylindrical pipe 16 connects the sprinkler 36 to a sprinkler outlet 38. A sprinkler or other water dispensing/spraying means is affixed to the sprinkler outlet 38 in order to spray water within the fenced area.

Worth noting is that the sprinkler outlet 38 is positioned far above ground. Consequently, a sprinkler can spray more area than conventional designs and will not be damaged during grooming of the fenced area. In most tennis court designs, the sprinklers usually positioned in the center of the fenced area can be eliminated due to the enhanced efficiency of the sprinklers in accordance with the present invention.

Figure 3:
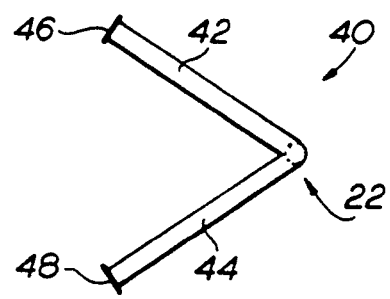
FIG. 3 shows a "Y" light pole assembly in accordance with the present invention wherein a dual light configuration is disposed at the top end so as to support two light fixtures separated by 70 degrees.

FIG. 3 shows a top view of a "Y" light pole assembly 40 in accordance with the present invention. The "Y" light pole assembly 40 is utilized for fenced areas requiring very intense lighting. In addition to a sprinkler path, the "Y" light pole assembly 40 supports two light fixtures spaced 70° apart. Accordingly, the cylindrical pipe 16 has two L-shaped bending portions 42, 44 at the light fixture end 22. Each of the L-shaped bending portions 42, 44 has a light fixture flange 46, 48, respectively. As a result of the configuration, light can be intensely projected into the area 14 surrounded by fence 12.

Figure 4:
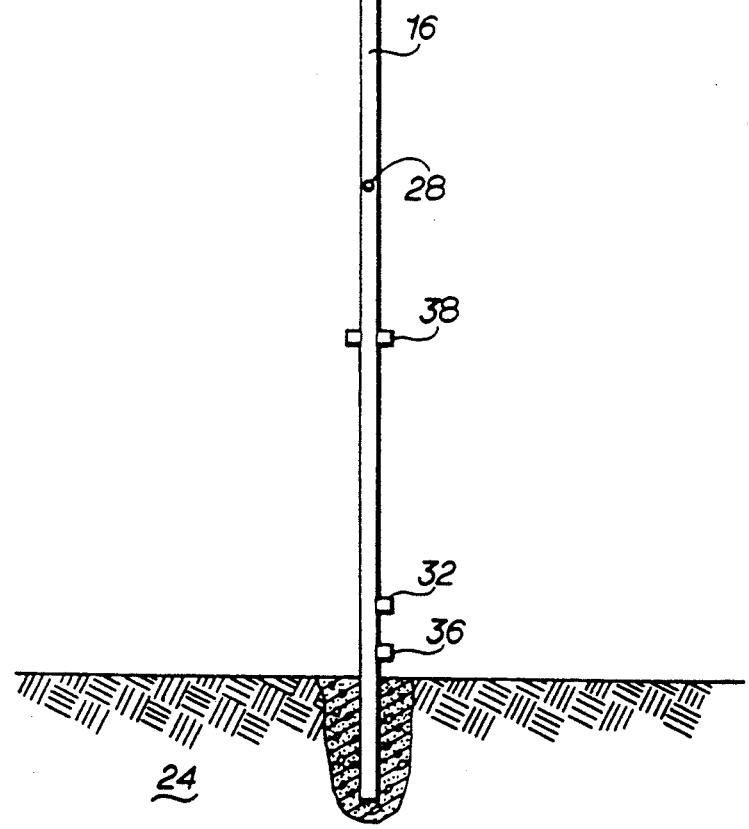
FIG. 4 shows a "T" light pole assembly in accordance with the present invention wherein a dual light configuration is disposed at the top end so as to support two light fixtures separated by 180 degrees.

FIG. 4 shows a side view of a "T" light pole assembly 50 in accordance with the present invention. The "T" light pole assembly 50 supports two light fixtures spaced 180° apart, in addition to a sprinkler path. Accordingly, the cylindrical pipe 16 has two L-shaped bending portions 42, 44 at the light fixture end 22. Each of the L-shaped bending portions 42, 44 has a light fixture flange 46, 48, respectively. As a result of the configuration, light can be projected to both sides of the fence 12. Furthermore, the "T" light pole assembly 40 can be positioned within the fenced area 14, as further shown in FIG. 1.

Figure 5:
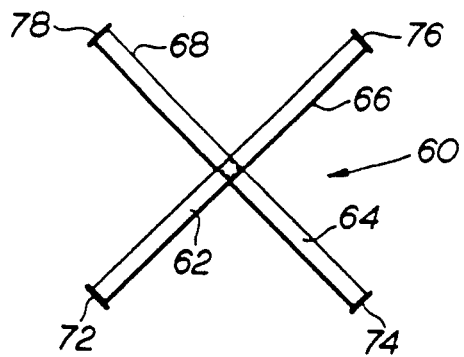
FIG. 5 shows a quad light pole assembly in accordance with the present invention wherein four light fixtures are disposed at the top end so as to support four light fixtures separated by 90 degrees.

FIG. 5 shows a top view of a quad light pole assembly 60 wherein light fixtures can be disposed 90° apart. The quad light pole assembly 60 has four L-shaped bending portions 62-68. Each of the L-shaped bending portions 62-68 has a flange 72-78, respectively, for mounting a light fixture. The quad light pole assembly 60 may be positioned in line with the fence 12, or alternatively, it may be placed within the interior of the fenced area 14. As with the other embodiments of this disclosure, the quad light pole assembly 60 can further comprise a sprinkler path therethrough.

Figure 6:
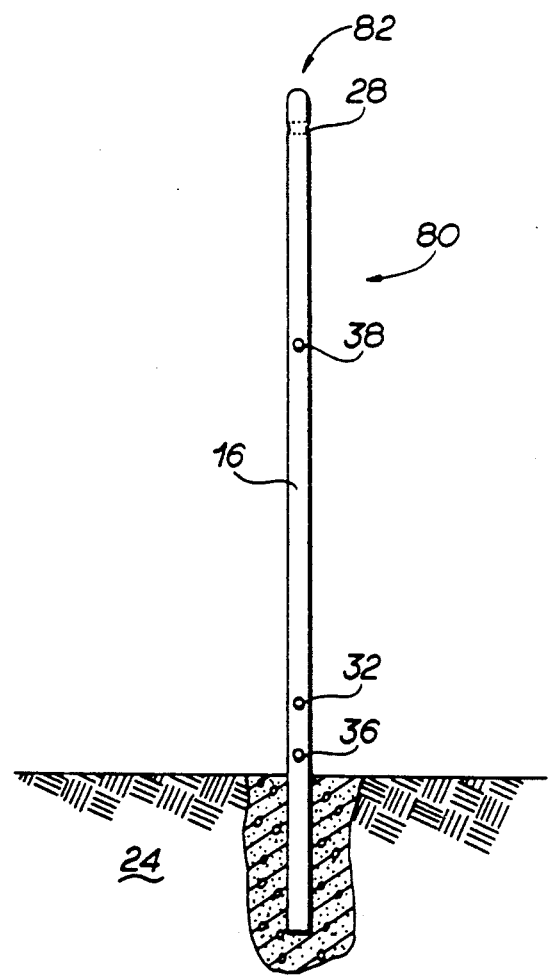
FIG. 6 shows a stub pole assembly in accordance with the present invention wherein a sprinkler means can be provided for dampening the fenced area.

FIG. 6 shows a stub pole assembly 80 in accordance with the present invention. A horizontal fence rail sleeve 28 is disposed near the top end 82 of the stub pole assembly 80. The stub pole assembly 80 provides for positioning a sprinkler to be sprayed within the interior of the fence 12. As shown in FIG. 5, the stub pole assembly 80 has a sprinkler supply inlet 36 and a sprinkler outlet 38 connected by a pipe, hose, or other like connecting apparatus. The stub pole assembly 80 may be added to an existing lighting configuration so as to enhance the sprinkler system.

Those persons skilled in the art will readily appreciate the many modifications that are possible without materially departing from the novel teachings of the present invention. For example, if the fence has several horizontal rails, the light pole assembly could be provided with several transversely-situated sleeves so as to accommodate a passthrough for each. Accordingly, all such modifications are intended to be included in the scope of the present invention, as defined in the following claims.

The inventor claims the following separate and distinct inventions:

1. A system for optimally providing light within a fenced area, comprising:
   a fence having a horizontal fence rail;
   a light pole assembly having a cylindrical pipe with a base end and a light fixture end, said base end adapted to be mounted in the ground, said light fixture end having a gradual L-shape bend leading to a flange for mounting a light fixture far above said horizontal fence rail, said cylindrical pipe having an internal sleeve transversely situated therethrough and positioned near the longitudinal midsection of said cylindrical pipe, said internal sleeve surrounding said horizontal fence rail, thereby positioning said light pole assembly in line with said fence; and
   electrical path means having an electrical supply inlet situated at said base end of said cylindrical pipe, an electrical channel through the length of said cylindrical pipe, and an electrical outlet surrounded by said flange.

2. The system of claim 1, further comprising a sprinkler path means having a sprinkler supply inlet situated at said base end of said cylindrical pipe, a sprinkler channel through said cylindrical pipe, and a sprinkler outlet situated along said cylindrical pipe and adapted to accept connection of a water sprinkler.

3. The system of claim 1, wherein said cylindrical pipe comprises steel.

4. The system of claim wherein said gradual L-shape bend is approximately 90 degrees.

5. The system of claim 1, wherein said gradual L-shape bend is approximately 80 degrees.

6. The system of claim 1, further comprising another gradual L-shape bend separated by 70 degrees from said gradual L-shape bend, said another gradual L-shape bend leading to another flange for mounting another light fixture.

7. The system of claim 1, further comprising another gradual L-shape bend separated by 180 degrees from said gradual L-shape bend, said another gradual L-shape bend leading to another flange for mounting another light fixture.

8. The system of claim 1, further comprising three other gradual L-shape bends wherein said three other gradual L-shape bends and said gradual L-shape bend are all separated from each other by 90 degrees and wherein said three other gradual L-shape bends each leading to a corresponding flange for mounting a corresponding light fixture.

9. The system of claim 1, wherein said fenced area further comprises a tennis court.

10. A light pole assembly for optimally providing light and water within a fenced area surrounded by a fence having a horizontal fence rail, comprising:

a single-piece cylindrical pipe with a base end and a light fixture end, said base end adapted to be mounted in the ground, said light fixture end having a gradual L-shape bend leading to a flange for mounting a light fixture far above said horizontal fence rail, said cylindrical pipe having an internal sleeve transversely situated therethrough and positioned near the longitudinal midsection of said cylindrical pipe, said internal sleeve surrounding said horizontal fence rail, thereby positioning said light pole assembly in line with said fence;

electrical path means having an electrical supply inlet situated at said base end of said cylindrical pipe, an electrical channel through the length of said cylindrical pipe, and an electrical outlet surrounded by said flange; and sprinkler path means having a sprinkler supply inlet situated at said base end of said cylindrical pipe, a sprinkler channel through said cylindrical pipe, and a sprinkler outlet situated along said cylindrical pipe and adapted to accept connection of a water sprinkler.

11. The light pole assembly of claim 10, wherein said cylindrical pipe comprises steel.

12. The light pole assembly of claim 10, wherein said gradual L-shape bend is approximately 90 degrees.

13. The light pole assembly of claim 10, wherein said gradual L-shape bend is approximately 80 degrees.

14. The light pole assembly of claim 10, further comprising another gradual L-shape bend separated by 70 degrees from said gradual L-shape bend, said another gradual L-shape bend leading to another flange for mounting another light fixture.

15. The light pole assembly of claim 10, further comprising another gradual L-shape bend separated by 180 degrees from said gradual L-shape bend, said another gradual L-shape bend leading to another flange for mounting another light fixture.

16. The light pole assembly of claim 10, further comprising three other gradual L-shape bends wherein said three other gradual L-shape bends and said gradual L-shape bend are all separated from each other by a 90 degrees and wherein said three other gradual L-shape bends each leading to a corresponding flange for mounting a corresponding light fixture.

17. The light pole assembly of claim 10, wherein said fenced area comprises a tennis court.

18. A method for constructing a light pole assembly for optimally providing light within a fenced area surrounded by a fence with a horizontal fence rail, comprising:

bending a gradual L-shape bend in alight fixture end of a cylindrical pipe also having a base end;

providing an internal sleeve transversely situated through said cylindrical pipe near the longitudinal midsection of said cylindrical pipe, said internal sleeve configured to accept said horizontal fence rail therethrough;

positioning said light pole assembly in line with said fence with said horizontal fence rail passing through said internal sleeve and with said light fixture end positioned far above said horizontal fence rail; and mounting said base end in the ground.

19. The method of claim 18, further comprising the step of providing a sprinkler path within said light pole assembly having a sprinkler supply inlet situated at said base end of said cylindrical pipe, a sprinkler channel through said cylindrical pipe, and a sprinkler outlet situated along said cylindrical pipe and adapted to accept connection of a water sprinkler.

20. The method of claim 18, further comprising the step of situating a tennis court within said fenced area.

* * * * *